US012222096B2

(12) United States Patent
Cao et al.

(10) Patent No.: US 12,222,096 B2
(45) Date of Patent: Feb. 11, 2025

(54) LIGHTING DEVICE HAVING COMPOSITE MICRO-STRUCTURE

(71) Applicant: Xiamen PVTECH Co., Ltd., Fujian (CN)

(72) Inventors: Liangliang Cao, Fujian (CN); Fuxing Lu, Fujian (CN); Minghua Cai, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/407,457

(22) Filed: Jan. 9, 2024

(65) Prior Publication Data

US 2024/0401771 A1 Dec. 5, 2024

(30) Foreign Application Priority Data

Jun. 2, 2023 (CN) ........................ 202310652159.0

(51) Int. Cl.

| | |
|---|---|
| ***F21V 5/00*** | (2018.01) |
| ***F21K 9/69*** | (2016.01) |
| ***F21S 8/06*** | (2006.01) |
| ***F21V 23/00*** | (2015.01) |
| *F21Y 115/10* | (2016.01) |

(52) U.S. Cl.

CPC ................ *F21V 5/002* (2013.01); *F21K 9/69* (2016.08); *F21S 8/061* (2013.01); *F21V 5/005* (2013.01); *F21V 23/005* (2013.01); *F21Y 2115/10* (2016.08)

(58) Field of Classification Search

CPC ........ F21K 9/69; F21V 23/004; F21V 23/005; F21V 5/043; F21V 5/002; F21V 5/005; F21S 8/061

See application file for complete search history.

(56) References Cited

U.S. PATENT DOCUMENTS

| | | | | | |
|---|---|---|---|---|---|
| 1,941,079 | A * | 12/1933 | Exelmans | F21V 13/04 | 362/245 |
| 10,352,510 | B2 * | 7/2019 | Van Winkle | F21V 23/04 | |
| 2009/0067151 | A1 * | 3/2009 | Sahlin | G02B 6/0035 | 362/361 |
| 2009/0296381 | A1 * | 12/2009 | Dubord | F21S 2/005 | 362/225 |
| 2018/0245753 | A1 * | 8/2018 | Magno | F21V 17/164 | |

* cited by examiner

*Primary Examiner* — Evan P Dzierzynski
*Assistant Examiner* — Nathaniel J Lee
(74) *Attorney, Agent, or Firm* — Winston Hsu

(57) ABSTRACT

A lighting device having composite micro-structure includes a main body, a light source board and a light cover. The main body has an installation slot. The light source board is disposed in the installation slot, and includes a circuit board and a light source disposed on one side of the circuit board. The light cover is disposed on one side of the main body to form an accommodating space between the light cover and the main body. The light source board being is disposed in the accommodating space. The light cover includes two vertical portions and a curved portion disposed between the vertical portions. The inner surface of the curved portion has a plurality of arc-shaped recess and a plurality of flat portions alternately arranged. The lighting device can achieve great lighting effects and increase the illuminance of a target area.

7 Claims, 12 Drawing Sheets

LIGHTING DEVICE HAVING COMPOSITE MICRO-STRUCTURE

BACKGROUND OF THE INVENTION

1. Field of the Invention

The present invention relates to a lighting device, in particular to a lighting device having composite micro-structure.

2. Description of the Prior Art

Due to advance of technology, the performance of tube lights has been greatly improved. The lighting characteristics of tube lights make them suitable for applications in factories, department stores, shopping malls, and similar environments. However, currently available tube lights have a wide light-emitting angle, such that the light emitted by a tube light will spread over a large area, rather than being concentrated in a specific region. If the user replaces the light cover of the tube light with a more transparent one, severe light spots may be incurred. Similarly, increasing the power of the tube light can increase the brightness, but the energy consumption of the tube light will be increased, which does not meet the energy-saving requirements.

SUMMARY OF THE INVENTION

One embodiment of the present invention provides a lighting device having composite micro-structure includes a main body, a light source board and a light cover. The main body has an installation slot. The light source board is disposed in the installation slot, and includes a circuit board and a light source disposed on one side of the circuit board. The light cover is disposed on one side of the main body to form an accommodating space between the light cover and the main body. The light source board being is disposed in the accommodating space. The light cover includes two vertical portions and a curved portion disposed between the vertical portions. The inner surface of the curved portion has a plurality of arc-shaped recess and a plurality of flat portions alternately arranged.

In one embodiment, the curved portion includes a central section and two lateral sections, and the arc-shaped recess and the flat portions are disposed in the central section.

In one embodiment, the inner surface of the lateral section is provided with a plurality of first sawteeth and the first sawteeth are obtuse-angled triangles.

In one embodiment, the surface area of the central section is greater than the surface area of the lateral section.

In one embodiment, the surface area of the lateral section is greater than the surface area of the vertical portion.

In one embodiment, the inner surface of the vertical portion is provided with a plurality of second sawteeth and the second sawteeth are acute-angled triangles.

In one embodiment, the inner surface of the vertical portion is provided with a plurality of second sawteeth and the second sawteeth are right-angled triangles.

In one embodiment, one side of the right-angled triangle is parallel to a horizontal line and the horizontal line is parallel to the light-emitting surface of the light source.

In one embodiment, the lighting device having further includes a hanging rope and a fixing element. One end of the hanging rope is fixed on the other side of the main body and the other end of the hanging rope is fixed at the fixing element.

In one embodiment, the installation slot includes a first installation portion having a first groove and a second installation portion having a second groove. The first installation portion is opposite to the second installation portion and the first groove is corresponding to the second groove. One side of the light source board is disposed in the first groove and the other side of the light source board is disposed in the second groove.

The lighting device having composite micro-structure in accordance with the embodiments of the present invention may have the following advantages:

(1) In one embodiment of the present invention, the light cover of the lighting device includes two vertical portions and a curved portion disposed between the two vertical portions. The inner surface of the curved portion has the arc-shaped recesses and flat portions arranged alternately. The integrated structure of these arc-shaped recesses and flat portions slightly offsets the light in the direction away from the central axis (which passes through the center of the light source and is perpendicular to the horizontal line) and effectively stretches the light spots generated by the integrated structure. In this way, the light spots generated by the light sources adjacent thereto can overlap with each other. Therefore, this integrated structure effectively reduces the visual impact caused by the light spots.

(2) In one embodiment of the present invention, the light cover of the lighting device includes two vertical portions and a curved portion disposed between the two vertical portions. The curved portion includes a central section and two lateral sections. The arc-shaped recesses and flat portions are disposed in the central section, while the inner surface of the lateral sections has the first sawteeth. The shape of these first sawteeth causes the light passing through the lateral sections to be slightly offset towards the central axis approaching the light source. Consequently, the light emitted by the light source can be more concentrated in the target area, which can effectively increase the illuminance in the target area so as to meet the energy-saving requirements and further reduce the visual impact caused by the light spots.

(3) In one embodiment of the present invention, the light cover of the lighting device includes two vertical portions and a curved portion disposed between the two vertical portions. The inner surface of the vertical portion has the second sawteeth. The shape of these second sawteeth reflects the light irradiated on the inner surface of the vertical portion. As a result, the light emitted by the light source is almost not transmitted through the vertical portions but is further concentrated towards the target area, such that the illuminance in the target area can be increased in order to meet the energy-saving requirements.

(4) In one embodiment of the present invention, the inner surface of the light cover of the lighting device has a composite micro-structure formed by the arc-shaped recesses, flat portions, first sawteeth, and second sawteeth. This composite micro-structure not only effectively reduces the visual impact caused by the light spots but also further increases the illuminance in the target area. Additionally, the illuminance in the target area can be more uniform. Therefore, the lighting device can satisfy actual requirements.

(5) In one embodiment of the present invention, the lighting device further includes the hanging ropes and fixing elements corresponding thereto. One end of each hanging rope is fixed to the other side of the main body, while the other end thereof is fixed at the corresponding fixing element. Therefore, the lighting device can be directly fixed to the ceiling and can also be suspended from the ceiling through the hanging ropes and fixing elements with a view to meeting the requirements of different applications. Thus, the lighting device can be more flexible in use and more comprehensive in application.

(6) In one embodiment of the present invention, the inner surface of the light cover of the lighting device has a special composite micro-structure. This composite micro-structure effectively improves the performance of the lighting device without significantly increasing the cost thereof. Therefore, the lighting device can achieve high practicality in order to conform to the requirements of different users.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
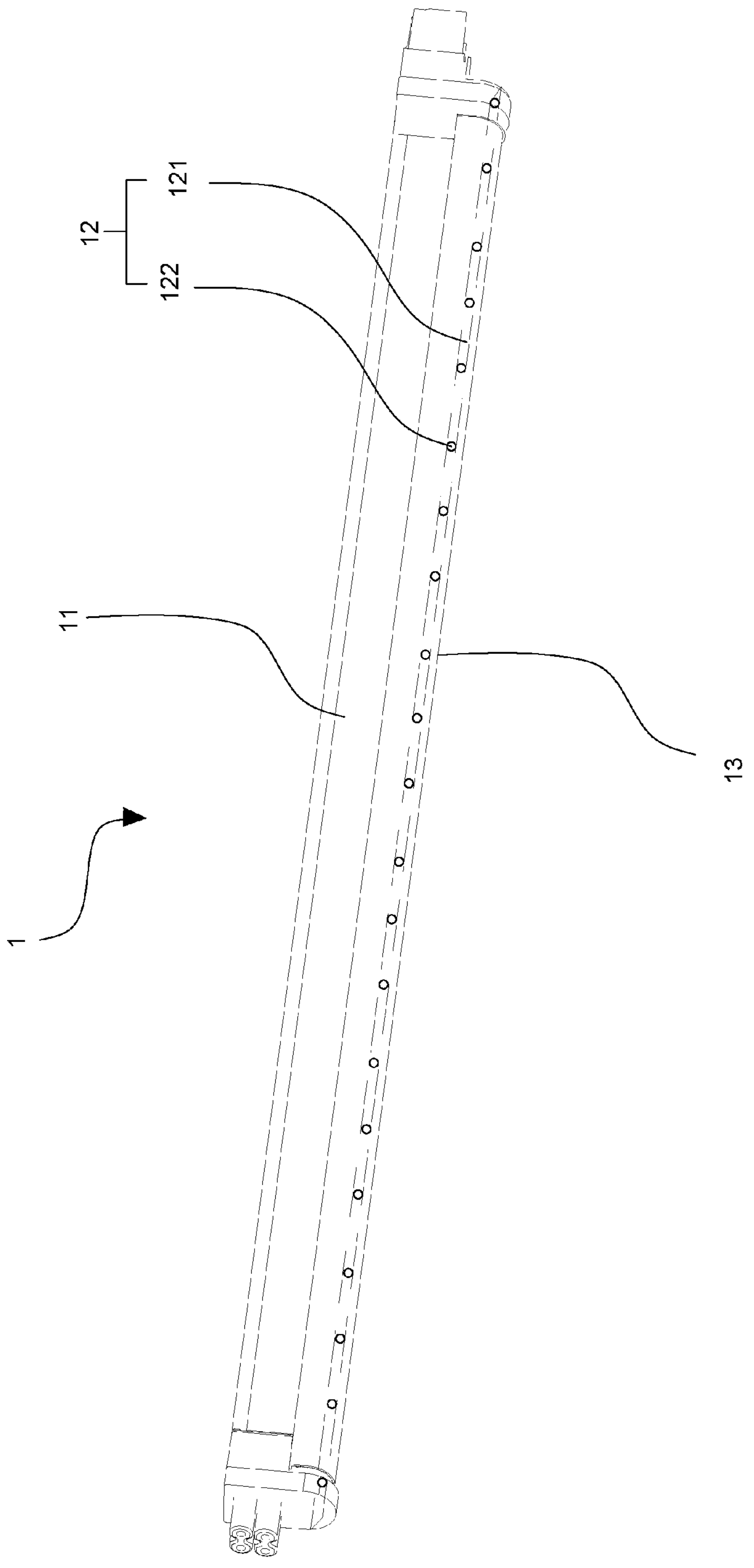
FIG. 1 is the perspective view of the lighting device having composite micro-structure in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
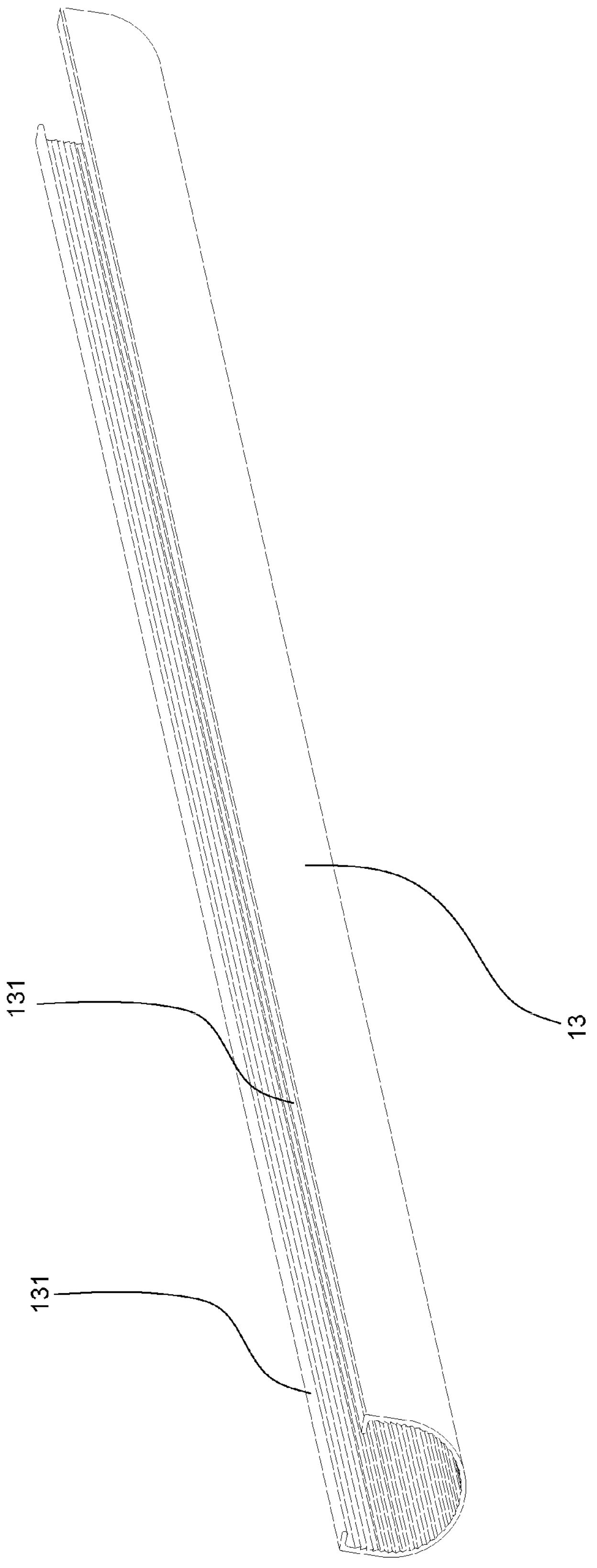
FIG. 2 is the perspective view of the light cover of the lighting device having composite micro-structure in accordance with one embodiment of the present invention.
Figure 3:
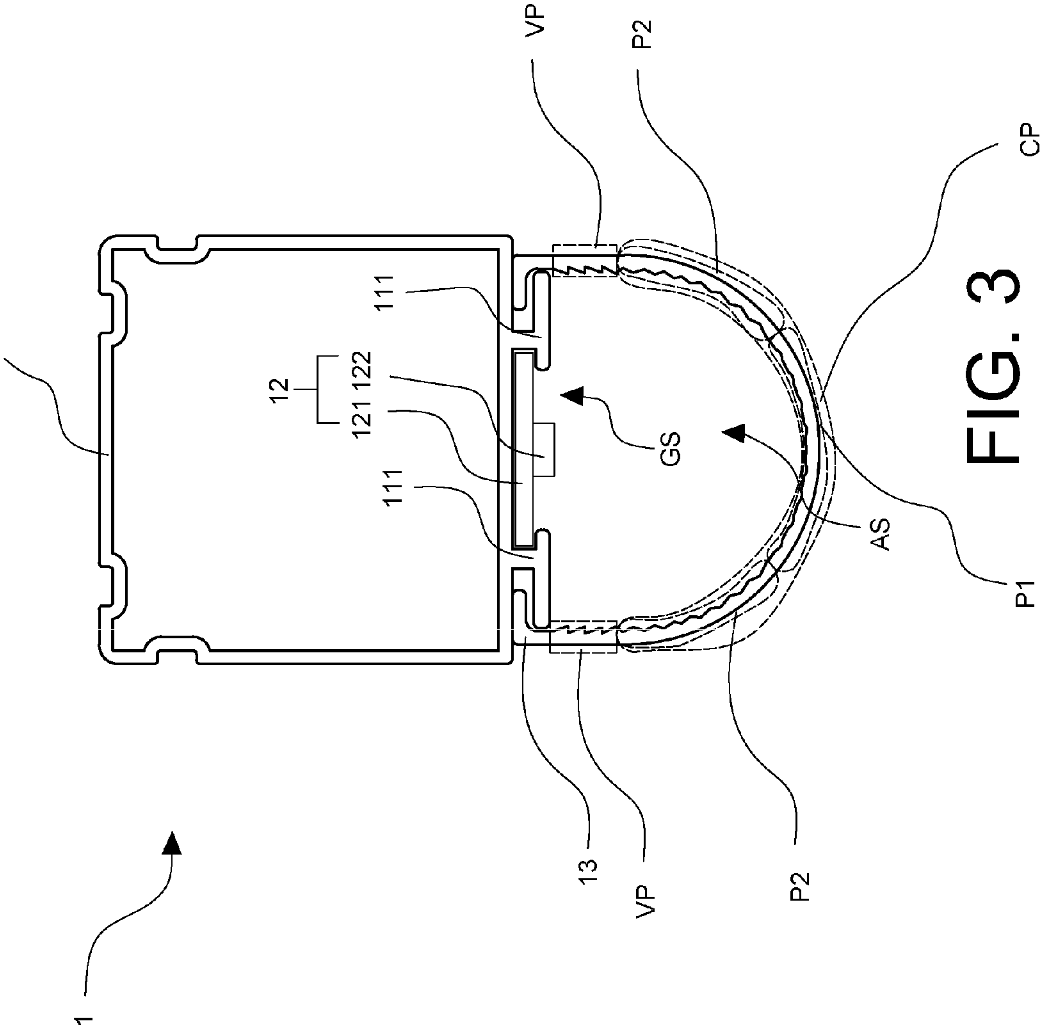
FIG. 3 is the first sectional view of the lighting device having composite micro-structure in accordance with one embodiment of the present invention.

Please refer to FIG. 1, FIG. 2 and FIG. 3. FIG. 1 is the perspective view of the lighting device having composite micro-structure in accordance with one embodiment of the present invention. FIG. 2 is the perspective view of the light cover of the lighting device having composite micro-structure in accordance with one embodiment of the present invention. FIG. 3 is the first sectional view of the lighting device having composite micro-structure in accordance with one embodiment of the present invention. As shown in FIG. 1, FIG. 2 and FIG. 3, the lighting device 1 includes a main body 11, a light source board 12, and a light cover 13. The lighting device 1 can be applied to portable lamps, such as portable searchlights, etc. Additionally, the lighting device 1 can also be a lamp fixed to the ceiling or wall of a building.

The main body 11 has two fixing portions 111 and an installation slot GS. The two fixing portions 111 are disposed on one side of the main body 11, and the installation slot GS is formed between the two fixing portions 111. The driver and other circuit components can be installed inside the main body 11.

The light source board 12 is disposed inside the installation slot GS. The light source board 12 includes a circuit board 121 and a plurality of light sources 122 disposed on one side of the circuit board 121. In one embodiment, the light sources 122 can be light-emitting diodes (LEDs) or similar components.

The light cover 13 has two protrusion portions 131. The protrusion portions 131 of the light cover 13 are engaged with the fixing portions 111 of the main body 11, so the light cover 13 can be fixed with one side of the main body 11. Of course, the above fixing structure is just an example; the light cover 13 and the main body 11 can be mutually fixed with each other via various different fixing structures. In this way, an accommodating space AS is formed between the light cover 13 and the main body 11. The light source board 12 is disposed inside the accommodating space AS. The light cover consists of two vertical portions VP and a curved portion CP disposed between the two vertical portions VP. The curved portion CP includes a central section P1 and two lateral sections P2. The surface area of the central section P1 is larger than the surface area of the lateral section P2, and the surface area of the lateral section P2 is larger than the surface area of the vertical portion VP. In one embodiment, the light cover 13 can be made of plastic materials, such as polycarbonate (PC), polypropylene (PP). In another embodiment, the material of the light cover 13 also contains nano diffusing agents.

The embodiment just exemplifies the present invention and is not intended to limit the scope of the present invention; any equivalent modification and variation according to the spirit of the present invention is to be also included within the scope of the following claims and their equivalents.

Figure 4:
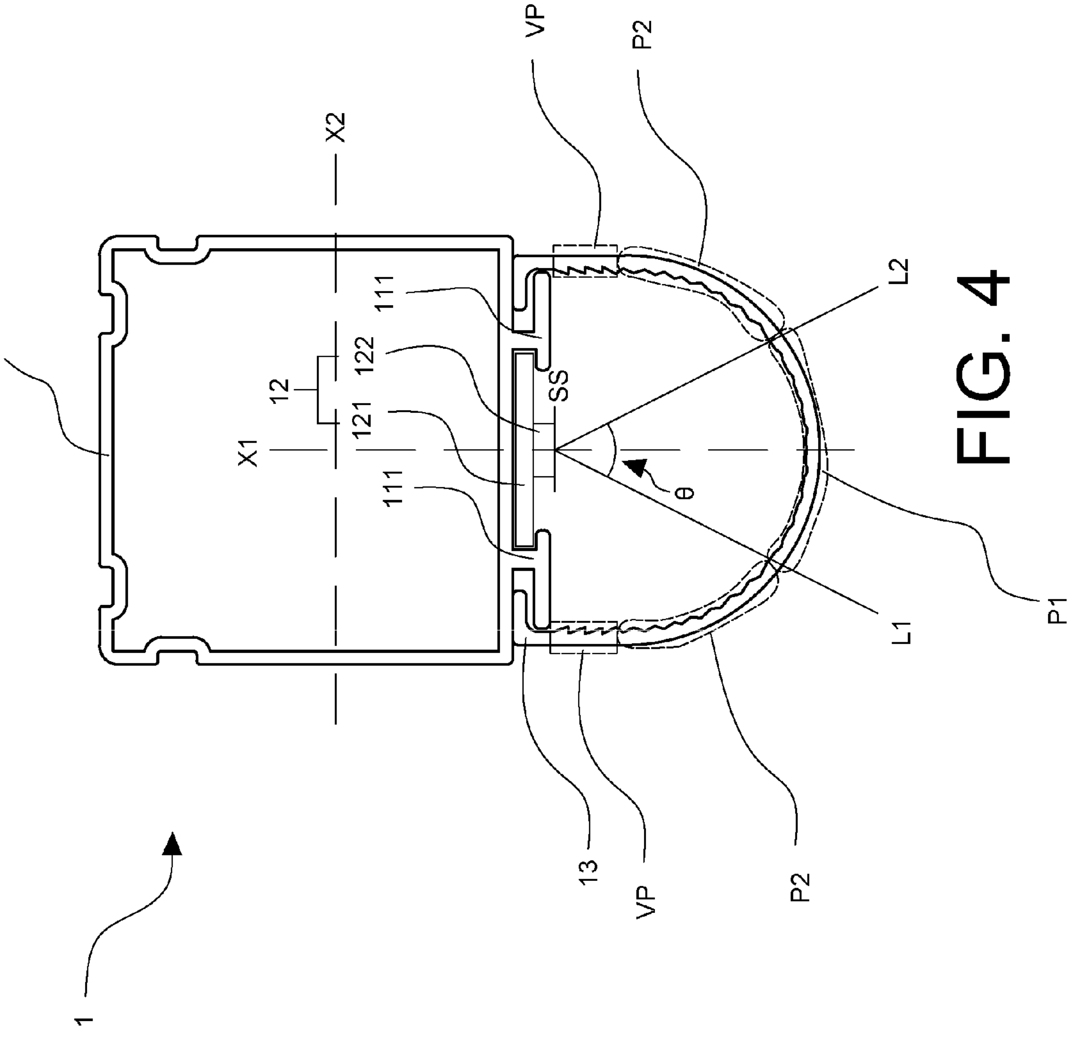
FIG. 4 is the second sectional view of the lighting device having composite micro-structure in accordance with one embodiment of the present invention.
Figure 5:
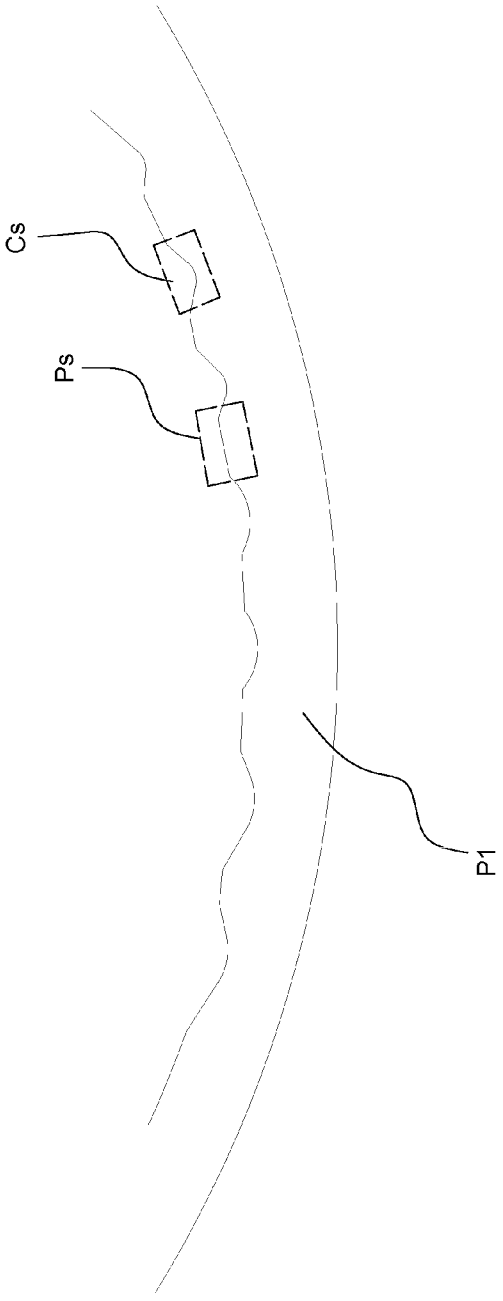
FIG. 5 is the first partial enlargement view of the light cover of the lighting device having composite micro-structure in accordance with one embodiment of the present invention.

Please refer to FIG. 4 and FIG. 5. FIG. 4 is the second sectional view of the lighting device having composite micro-structure in accordance with one embodiment of the present invention. FIG. 5 is the first partial enlargement view of the light cover of the lighting device having composite micro-structure in accordance with one embodiment of the present invention. As shown in FIG. 4 and FIG. 5, the inner surface of the central section P1 of the curved portion CP of the light cover 13 is provided with a plurality of arc-shaped recesses Cs and flat portions Ps arranged alternately.

Approximately 80% of the light emitted by the light source 122 is concentrated within the central region (the target area) of the light-emitting angle, which is the range between line segment L1 and line segment L2 (θ is substantially equal to 45°). Therefore, 80% of the light emitted by the light source 122 passes through the central section P1.

The integrated structure of the arc-shaped recesses Cs and flat portions Ps in the central section P1 of the curved portion CP can make the light passing through this structure be slightly diverted away from the central axis X1 of the light source 122 (the central axis X1 passes through the center of the light source 122 and is perpendicular to the horizontal line X2, which is parallel to the light-emitting surface SS of the light source 122). As a result, the light-emitting angle of 80% of the light emitted by the light source 122 can be increased to approximately 55° to 68° (the nano diffusing agent can also slightly increase the angle) in order to make the illuminance of the target area be more uniform.

Furthermore, this integrated structure effectively stretches the light spots generated by the light passing through it. Consequently, the light spots produced by several light sources 122 adjacent to each other can overlap with each other. Thus, this integrated structure significantly reduces the visual impact caused by the light spots with a view to improving the user experience.

The embodiment just exemplifies the present invention and is not intended to limit the scope of the present invention; any equivalent modification and variation according to the spirit of the present invention is to be also included within the scope of the following claims and their equivalents.

Figure 6:
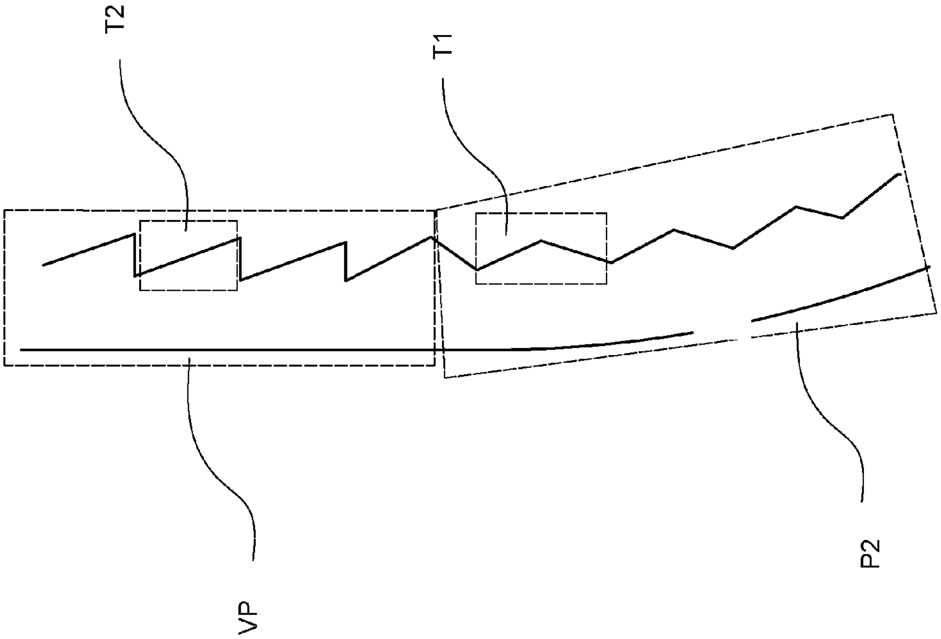
FIG. 6 is the second partial enlargement view of the light cover of the lighting device having composite micro-structure in accordance with one embodiment of the present invention.
Figure 7:
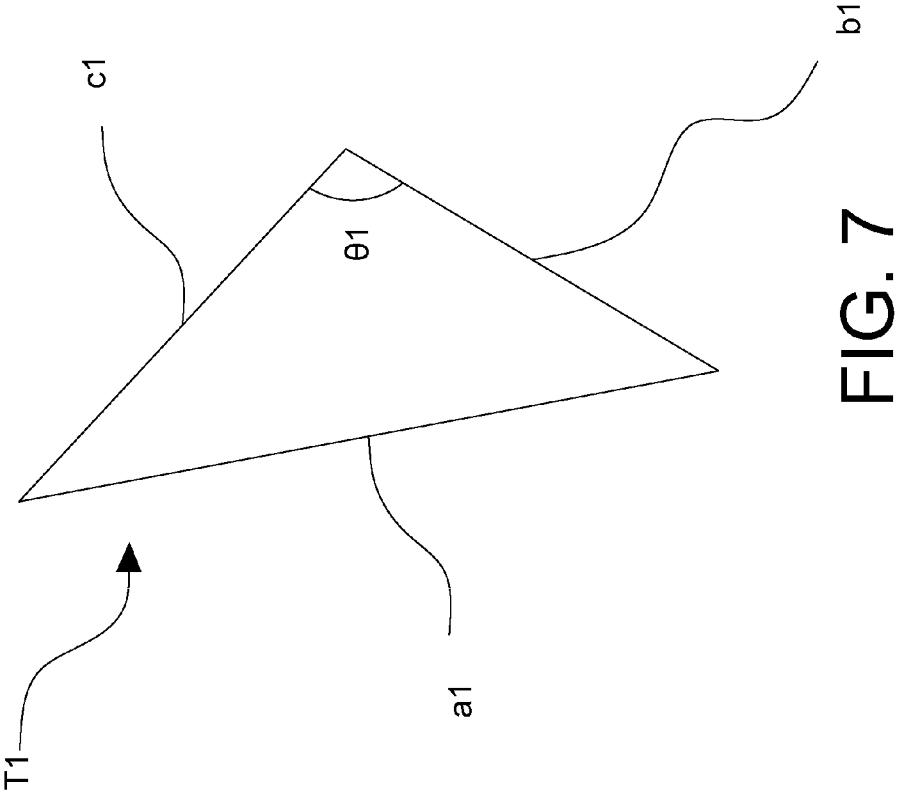
FIG. 7 is the schematic view of the first sawtooth of the lighting device having composite micro-structure in accordance with one embodiment of the present invention.
Figure 8:
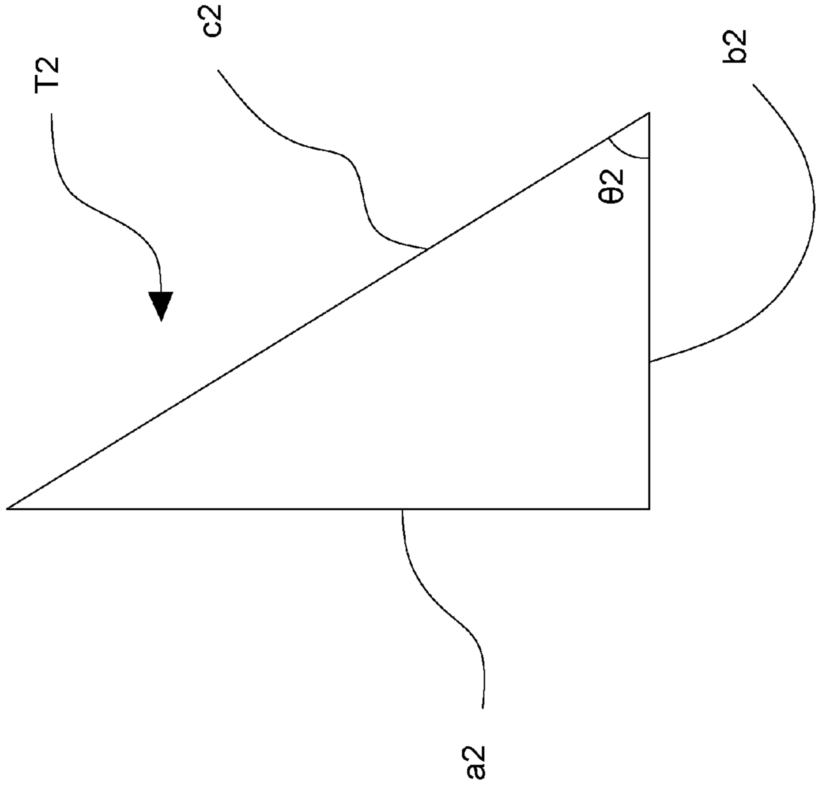
FIG. 8 is the schematic view of the second sawtooth of the lighting device having composite micro-structure in accordance with one embodiment of the present invention.

Please refer to FIG. 6, FIG. 7 and FIG. 8, and please also refer to FIG. 4. FIG. 6 is the second partial enlargement view of the light cover of the lighting device having composite micro-structure in accordance with one embodiment of the present invention. FIG. 7 is the schematic view of the first sawtooth of the lighting device having composite micro-structure in accordance with one embodiment of the present invention. FIG. 8 is the schematic view of the second sawtooth of the lighting device having composite micro-structure in accordance with one embodiment of the present invention. As shown in FIG. 6, the inner surface of the lateral section P2 of the curved portion CP of the light cover 13 has a plurality of first sawteeth T1.

As shown in FIG. 7, the first sawteeth T1 are obtuse-angled triangles. That is to say, the corner, towards the central axis X1 of the light source 12, of the first sawteeth T1 is greater than 90° (θ1>90°). In this embodiment, each first sawtooth T1 has a base a1 and two sides b1, c1. The lengths of the two sides b1, c1 of the first sawtooth T1 can be unequal. In other words, one side c1 of the first sawtooth T1 is slightly larger than the other side b1 (in this embodiment, the side farthest from the central axis X1 of the light source 122 is defined as the base a1), and the other two sides are defined as sides b1, c1. In another embodiment, the lengths of the two sides b1, c1 of the first sawtooth T1 can be equal. In other words, the first sawtooth T1 can be an isosceles triangle. The above structures are just for illustration, the shape of the first sawtooth T1 can be adjusted according to actual requirements.

Approximately 20% of the light emitted by the light source 122 is concentrated on the two lateral sections P2 of the curved portion CP of the light cover 13. The shape of the first sawteeth T1 of the lateral sections P2 can cause the light passing through the lateral sections P2 to be slightly diverted towards the central axis X1 of the light source 122. Therefore, the light emitted by the light source 122 can be more concentrated in the target area so as to effectively enhance the illuminance of the target area.

As shown in FIG. 6, the inner surface of the vertical portions VP of the light cover 13 has a plurality of second sawteeth T2. As shown in FIG. 8, the second sawteeth T2 are right-angled triangles. That is to say, the corner, towards the central axis X1 of the light source 122, of the second sawteeth T2 is less than 90°. In this embodiment, each second sawtooth T2 has a base a2 and two sides b2, c2. One side b2 of the second sawtooth T2 can be parallel to the horizontal line X2 (in this embodiment, the side farthest from the central axis X1 of the light source 122 is defined as the base a2, and the other two sides are defined as sides b2, c2). In another embodiment, the second sawteeth T2 can also be acute-angled triangles. Similarly, the angle of the second sawtooth T2 towards the central axis X1 of the light source 122 is less than 90° (θ2<90°). The above structures are just for illustration, the shape of the second sawtooth T2 can be adjusted according to actual requirements.

Only a small portion of the light emitted by the light source 122 will be irradiated on the inner surface of the vertical portions VP. The shape of the second sawteeth T2 of the vertical portions VP can reflect the light irradiated on the inner surface of the vertical portions VP. Therefore, the light emitted by the light source 122 will hardly pass through the vertical portions VP but will be more concentrated towards the target area. Thus, the illuminance of the target area can be further increase with a view to meeting the energy-saving requirements.

In another embodiment, the lighting device 1 further includes several hanging ropes and fixing elements corresponding thereto. Therefore, the lighting device 1 can not only be directly fixed to the ceiling but can also be suspended from the ceiling through the hanging ropes and fixing elements so as to meet the requirements of different applications.

As described above, the light cover 13 of the lighting device 1 includes the two vertical portions VP and the curved portion CP disposed between the two vertical portions VP. The inner surface of the curved portion CP has the arc-shaped recesses Cs and flat portions Ps arranged alternately. The integrated structure of these arc-shaped recesses Cs and flat portions Ps slightly offsets the light in the direction away from the central axis X1 (which passes through the center of the light source 122 and is perpendicular to the horizontal line X2) and effectively stretches the light spots generated by the integrated structure. In this way, the light spots generated by the adjacent light sources 122 can overlap with each other. Therefore, this integrated structure effectively reduces the visual impact caused by the light spots.

According to one embodiment of the present invention, the light cover of the lighting device includes two vertical portions and a curved portion disposed between the two vertical portions. The curved portion includes a central section and two lateral sections. The arc-shaped recesses and flat portions are disposed in the central section, while the inner surface of the lateral sections has the first sawteeth. The shape of these first sawteeth causes the light passing through the lateral sections to be slightly offset towards the central axis approaching the light source. Consequently, the light emitted by the light source can be more concentrated in the target area, which can effectively increase the illuminance in the target area so as to meet the energy-saving requirements and further reduce the visual impact caused by the light spots.

In addition, in this embodiment, the light cover 13 of the lighting device 1 includes the two vertical portions VP and the curved portion CP disposed between the two vertical portions VP. The inner surface of the vertical portion has the second sawteeth T2. The shape of these second sawteeth T2 reflects the light irradiated on the inner surface of the vertical portions VP. As a result, the light emitted by the light source 122 is almost not transmitted through the vertical portions VP but is further concentrated towards the target area, such that the illuminance of the target area can be increased in order to meet the energy-saving requirements.

Moreover, in this embodiment, the inner surface of the light cover 13 of the lighting device 1 has the composite micro-structure formed by the arc-shaped recesses Cs, flat portions Ps, first sawteeth T1, and second sawteeth T2. This composite micro-structure not only effectively reduces the visual impact caused by the light spots but also further increases the illuminance of the target area. Additionally, the illuminance of the target area can be more uniform. Therefore, the lighting device can satisfy actual requirements.

The embodiment just exemplifies the present invention and is not intended to limit the scope of the present invention; any equivalent modification and variation according to the spirit of the present invention is to be also included within the scope of the following claims and their equivalents.

It is worthy to point out that as currently available tube lights have a wide light-emitting angle, the light emitted by a tube light will spread over a large area, rather than being concentrated in a specific region. If the user replaces the light cover of the tube light with a more transparent one, severe light spots may be incurred. Similarly, increasing the power of the tube light can increase the brightness, but the energy consumption of the tube light will be increased, which does not meet the energy-saving requirements. On the contrary, according to one embodiment of the present invention, the light cover of the lighting device includes two vertical portions and a curved portion disposed between the two vertical portions. The inner surface of the curved portion has the arc-shaped recesses and flat portions arranged alternately. The integrated structure of these arc-shaped recesses and flat portions slightly offsets the light in the direction away from the central axis (which passes through the center of the light source and is perpendicular to the horizontal line) and effectively stretches the light spots generated by the integrated structure. In this way, the light spots generated by the light sources adjacent thereto can overlap with each other. Therefore, this integrated structure effectively reduces the visual impact caused by the light spots.

According to one embodiment of the present invention, the light cover of the lighting device includes two vertical portions and a curved portion disposed between the two vertical portions. The curved portion includes a central section and two lateral sections. The arc-shaped recesses and flat portions are disposed in the central section, while the inner surface of the lateral sections has the first sawteeth. The shape of these first sawteeth causes the light passing through the lateral sections to be slightly offset towards the central axis approaching the light source. Consequently, the light emitted by the light source can be more concentrated of the target area, which can effectively increase the illuminance of the target area so as to meet the energy-saving requirements and further reduce the visual impact caused by the light spots.

Also, according to one embodiment of the present invention, the light cover of the lighting device includes two vertical portions and a curved portion disposed between the two vertical portions. The inner surface of the vertical portion has the second sawteeth. The shape of these second sawteeth reflects the light irradiated on the inner surface of the vertical portion. As a result, the light emitted by the light source is almost not transmitted through the vertical portions but is further concentrated towards the target area, such that the illuminance of the target area can be increased in order to meet the energy-saving requirements.

Further, according to one embodiment of the present invention, the inner surface of the light cover of the lighting device has a composite micro-structure formed by the arc-shaped recesses, flat portions, first sawteeth, and second sawteeth. This composite micro-structure not only effectively reduces the visual impact caused by the light spots but also further increases the illuminance of the target area. Additionally, the illuminance of the target area can be more uniform. Therefore, the lighting device can satisfy actual requirements.

Moreover, according to one embodiment of the present invention, the lighting device further includes the hanging ropes and fixing elements corresponding thereto. One end of each hanging rope is fixed to the other side of the main body, while the other end thereof is fixed at the corresponding fixing element. Therefore, the lighting device can be directly fixed to the ceiling and can also be suspended from the ceiling through the hanging ropes and fixing elements with a view to meeting the requirements of different applications. Thus, the lighting device can be more flexible in use and more comprehensive in application.

Furthermore, according to one embodiment of the present invention, the inner surface of the light cover of the lighting device composite has a special micro-structure. This composite micro-structure effectively improves the performance of the lighting device without significantly increasing the cost thereof. Therefore, the lighting device can achieve high practicality in order to conform to the requirements of different users. As set forth above, the lighting device having composite micro-structure according to the embodiments of the present invention can definitely achieve great technical effects.

Figure 9:
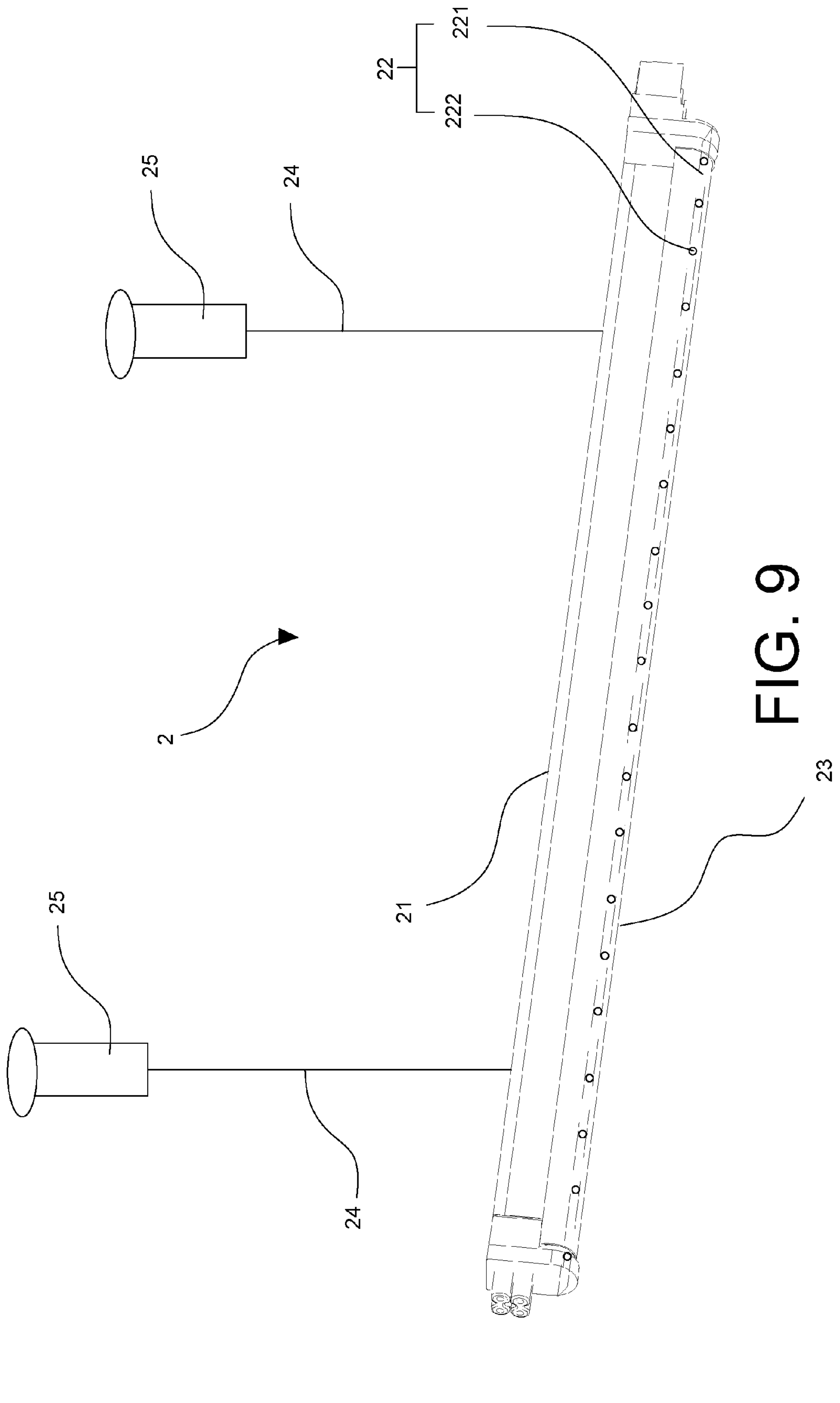
FIG. 9 is the perspective view of the lighting device having composite micro-structure in accordance with another embodiment of the present invention.

Please refer to FIG. 9, which is the perspective view of the lighting device having composite micro-structure in accordance with another embodiment of the present invention. As shown in FIG. 9, the lighting device 2 includes a main body 21, a light source board 22, and a light cover 23. The light source board 22 includes a circuit board 21 and a plurality of light sources 222 disposed on one side of the circuit board 221. In this embodiment, the light cover 23 of the lighting device 2 also has a composite micro-structure similar to that of the previous embodiment, which can achieve the same effectiveness.

The above elements are similar to those of the previous embodiment and will not be further described here. The difference from the previous embodiment is that the lighting device 2 in this embodiment further includes two hanging ropes 24 and two fixing elements 25. One end of each hanging rope 24 is fixed on the other side of the main body 21, and the other end thereof is fixed to the corresponding fixing element 25. The two fixing elements 25 can be directly attached to the ceiling.

Therefore, the lighting device 2 can be directly fixed to the ceiling and can also be suspended from the ceiling through the hanging ropes 24 and fixing elements 25 in order to increase the illuminance of the target area. Thus, the lighting device 2 can meet the requirements of different application, so the lighting device 2 can be more flexible in use and more comprehensive in application.

As mentioned earlier, the inner surface of the light cover 23 of the lighting device 2 has the special composite micro-structure. This composite micro-structure effectively enhances the performance of the lighting device 2 without significantly increasing the cost thereof. Therefore, the lighting device 2 can achieve high practicality so as to meet the requirements of different users.

The embodiment just exemplifies the present invention and is not intended to limit the scope of the present invention; any equivalent modification and variation according to the spirit of the present invention is to be also included within the scope of the following claims and their equivalents.

Figure 10:
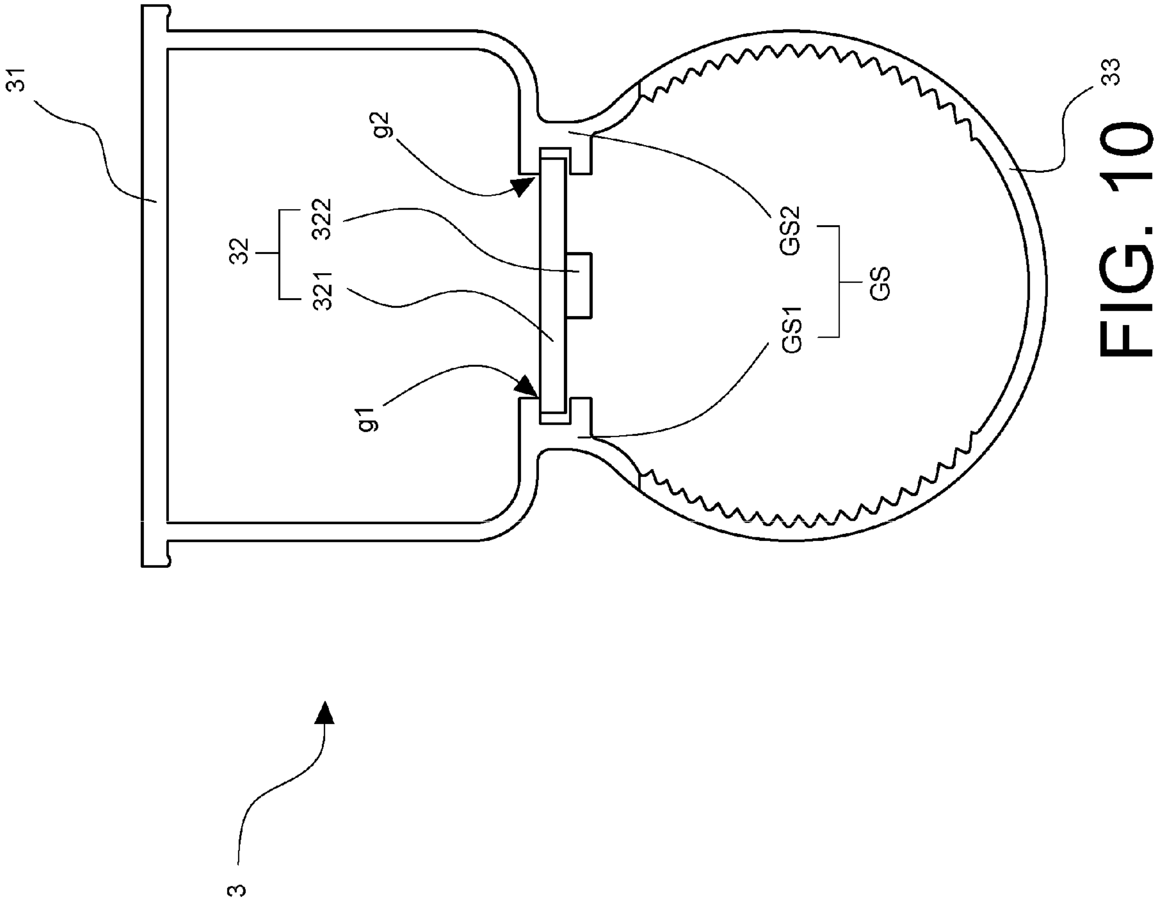
FIG. 10 is the sectional view of the lighting device having composite micro-structure in accordance with still another embodiment of the present invention.

Please refer to FIG. 10, which is the sectional view of the lighting device having composite micro-structure in accordance with still another embodiment of the present invention. As shown in FIG. 10, the lighting device 3 includes a main body 31, a light source board 32, and a light cover 33.

The main body 31 has an installation slot GS, and the light cover 33 is connected to and covers the installation slot GS. Drivers and other circuit components can be disposed inside the main body 31. The light cover 33 also has the same composite microstructure as the previous embodiment.

The light source board 32 is disposed inside the installation slot GS. The light source board 32 includes a circuit board 321 and a plurality of light sources 322 disposed on one side of the circuit board 321.

The difference between this embodiment and the previous embodiment is that the installation slot GS includes a first installation portion GS1 and a second installation portion GS2. The first installation portion GS1 and the second installation portion GS2 are opposite to each other. The first installation portion GS1 has a first groove g1, and the second installation portion GS2 has a second groove g2. Therefore, the first groove g1 is corresponding to the second groove g1. One side of the light source board 32 is disposed in the first groove g1, and the other side of the light source board 32 is disposed in the second groove g2. Through this structure, the beam angle of the light emitted by the light source 322 can be approximately 90°.

Similarly, the lighting device 3 can be directly fixed to the ceiling and can also be suspended from the ceiling through the hanging ropes and fixing elements to increase the illuminance of the target area. Therefore, the lighting device 3 can meet the requirements of different application, such that the lighting device 3 can be more flexible in use and more comprehensive in application.

The embodiment just exemplifies the present invention and is not intended to limit the scope of the present invention; any equivalent modification and variation according to the spirit of the present invention is to be also included within the scope of the following claims and their equivalents.

Figure 11:
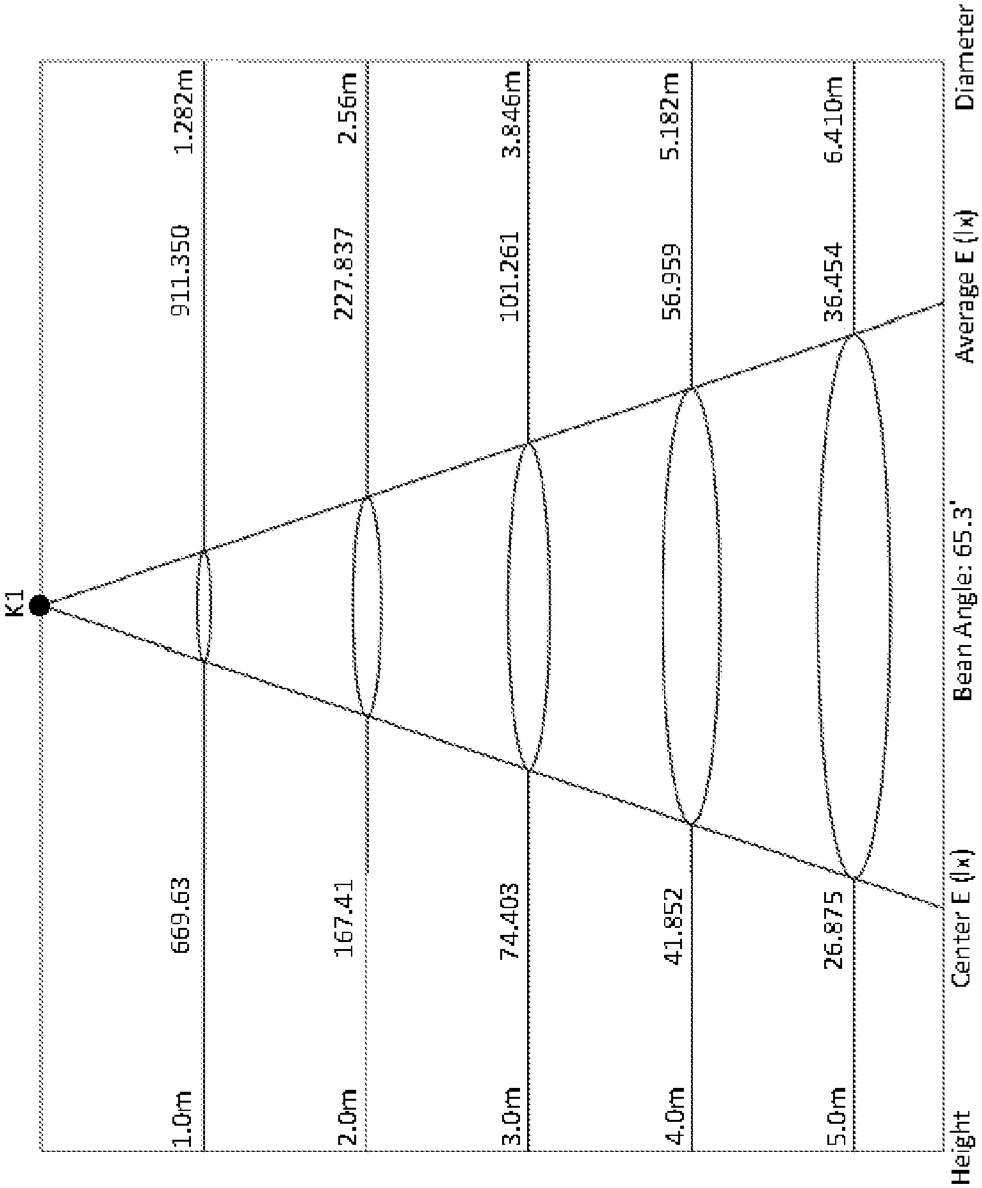
FIG. 11 is the first schematic view 41 of the illuminance-distance curve of the lighting device of FIG. 1~FIG. 8.
Figure 12:
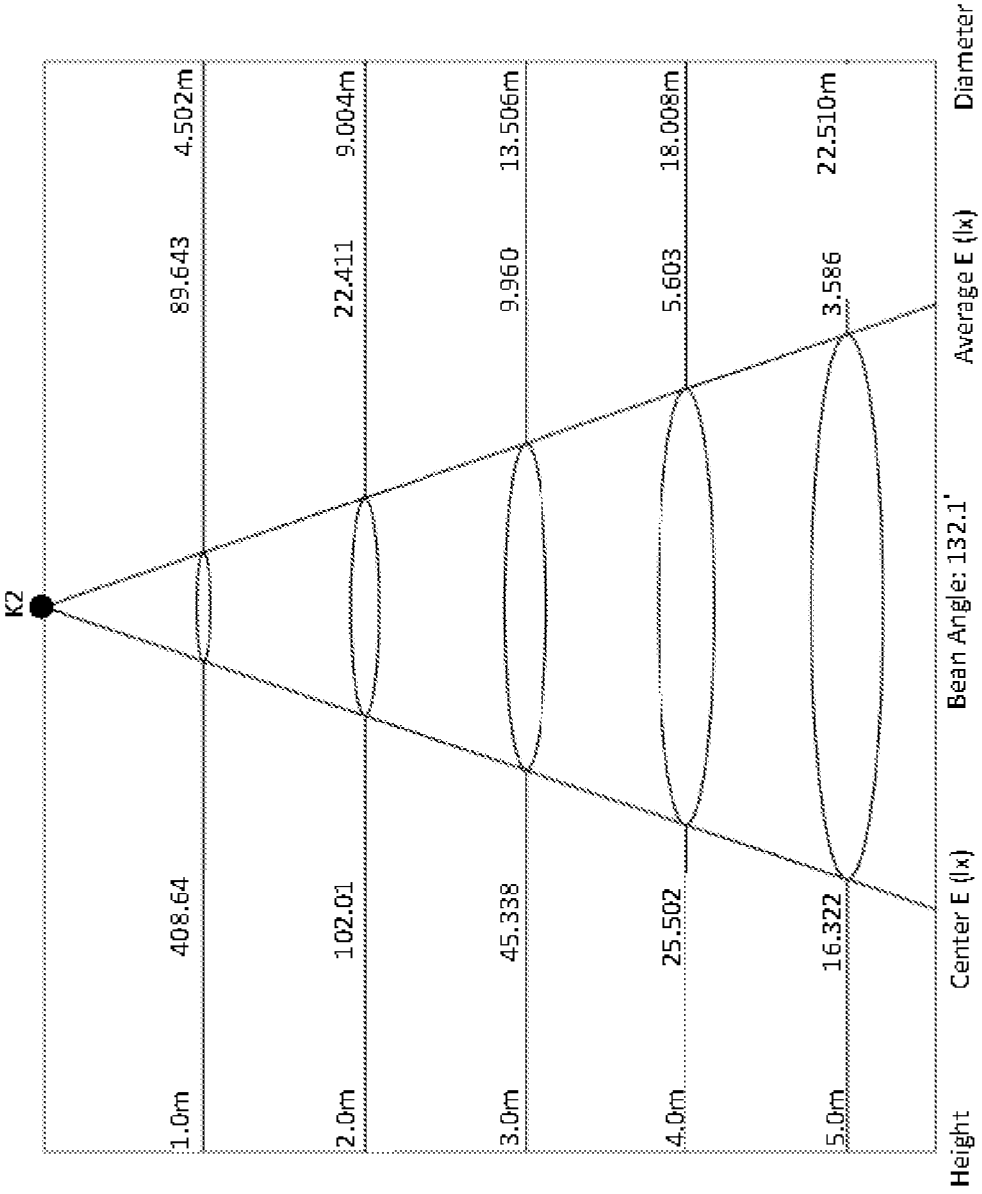
FIG. 12 is the second schematic view of the illuminance-distance curve of the lighting device of FIG. 1~FIG. 8.

Please refer to FIG. 11 and FIG. 12. FIG. 11 is the first schematic view of the illuminance-distance curve of the lighting device of FIG. 1~FIG. 8; the light cover 13 of the lighting device 1 is make of a first material. FIG. 12 is the second schematic view of the illuminance-distance curve of the lighting device of FIG. 1~FIG. 8; the light cover 13 of the lighting device 1 is make of a second material. The haze of the second material is greater than that of the first material. As shown in FIG. 11, the lighting device 1 is installed at the point K1. The bean angle of the lighting device 1 is 65.3°. FIG. 11 shows the illuminances of the central points (Center E) of the lighting areas having different light diameters of the lighting device 1 disposed at different heights (the lighting areas of different heights have different light diameters; for instance, when the height of the lighting device 1 is 1 m, the light diameter of the lighting area of the lighting device 1 is 1.282 m; the light diameter means the distance between the two points farthest apart within the lighting area). FIG. 11 also shows the average illuminances of the lighting areas of the lighting device 1 disposed at different heights. According to FIG. 11, the lighting device 1 can achieve great lighting effects and the illuminance of the target area can be increased.

As shown in FIG. 12, the lighting device 1 is installed at the point K2. The bean angle of the lighting device 1 is 132.1°. FIG. 12 shows the illuminances of the central points (Center E) of the lighting areas having different light diameters of the lighting device 1 disposed at different heights. FIG. 12 also shows the average illuminances of the lighting areas of the lighting device 1 disposed at different heights. According to FIG. 12, the lighting device 1 can also achieve great lighting effects and the illuminance of the target area can be increased.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the light cover of the lighting device includes two vertical portions and a curved portion disposed between the two vertical portions. The inner surface of the curved portion has the arc-shaped recesses and flat portions arranged alternately. The integrated structure of these arc-shaped recesses and flat portions slightly offsets the light in the direction away from the central axis (which passes through the center of the light source and is perpendicular to the horizontal line) and effectively stretches the light spots generated by the integrated structure. In this way, the light spots generated by the light sources adjacent thereto can overlap with each other. Therefore, this integrated structure effectively reduces the visual impact caused by the light spots.

According to one embodiment of the present invention, the light cover of the lighting device includes two vertical portions and a curved portion disposed between the two vertical portions. The curved portion includes a central section and two lateral sections. The arc-shaped recesses and flat portions are disposed in the central section, while the inner surface of the lateral sections has the first sawteeth. The shape of these first sawteeth causes the light passing through the lateral sections to be slightly offset towards the central axis approaching the light source. Consequently, the light emitted by the light source can be more concentrated of the target area, which can effectively increase the illuminance of the target area so as to meet the energy-saving requirements and further reduce the visual impact caused by the light spots.

Also, according to one embodiment of the present invention, the light cover of the lighting device includes two vertical portions and a curved portion disposed between the two vertical portions. The inner surface of the vertical portion has the second sawteeth. The shape of these second sawteeth reflects the light irradiated on the inner surface of the vertical portion. As a result, the light emitted by the light source is almost not transmitted through the vertical portions but is further concentrated towards the target area, such that the illuminance of the target area can be increased in order to meet the energy-saving requirements.

Further, according to one embodiment of the present invention, the inner surface of the light cover of the lighting device has a composite micro-structure formed by the arc-shaped recesses, flat portions, first sawteeth, and second sawteeth. This composite micro-structure not only effectively reduces the visual impact caused by the light spots but also further increases the illuminance of the target area. Additionally, the illuminance of the target area can be more uniform. Therefore, the lighting device can satisfy actual requirements.

Moreover, according to one embodiment of the present invention, the lighting device further includes the hanging ropes and fixing elements corresponding thereto. One end of each hanging rope is fixed to the other side of the main body, while the other end thereof is fixed at the corresponding fixing element. Therefore, the lighting device can be directly fixed to the ceiling and can also be suspended from the ceiling through the hanging ropes and fixing elements with a view to meeting the requirements of different applications. Thus, the lighting device can be more flexible in use and more comprehensive in application.

Furthermore, according to one embodiment of the present invention, the inner surface of the light cover of the lighting device has a special composite micro-structure. This composite micro-structure effectively improves the performance of the lighting device without significantly increasing the cost thereof. Therefore, the lighting device can achieve high practicality in order to conform to the requirements of different users.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device having composite micro-structure, comprising:

a main body having an installation slot;

a light source board disposed in the installation slot, and comprising a circuit board and a light source disposed on one side of the circuit board; and a light cover disposed on one side of the main body to form an accommodating space between the light cover and the main body, and the light source board being disposed in the accommodating space, wherein the light cover comprises two vertical portions and a curved portion disposed between the vertical portions, and an inner surface of the curved portion has a plurality of arc-shaped recess and a plurality of flat portions alternately arranged;

wherein the curved portion comprises a central section and two lateral sections, and the arc-shaped recess and the flat portions are disposed in the central section, wherein an inner surface of the lateral section is provided with a plurality of first sawteeth and the first sawteeth are obtuse-angled triangles, wherein an inner surface of the vertical portion is provided with a plurality of second sawteeth and the second sawteeth are acute-angled triangles.

2. The lighting device having composite micro-structure as claimed in claim 1, wherein a surface area of the central section is greater than a surface area of the lateral section.

3. The lighting device having composite micro-structure as claimed in claim 1, wherein a surface area of the lateral section is greater than a surface area of the vertical portion.

4. The lighting device having composite micro-structure as claimed in claim 1, wherein an inner surface of the vertical portion is provided with a plurality of second sawteeth and the second sawteeth are right-angled triangles.

5. The lighting device having composite micro-structure as claimed in claim 4, wherein one side of the right-angled triangle is parallel to a horizontal line and the horizontal line is parallel to a light-emitting surface of the light source.

6. The lighting device having composite micro-structure as claimed in claim 1, further comprising a hanging rope and a fixing element, wherein one end of the hanging rope is fixed on another side of the main body and another end of the hanging rope is fixed at the fixing element.

7. The lighting device having composite micro-structure as claimed in claim 1, wherein the installation slot comprises a first installation portion having a first groove and a second installation portion having a second groove, wherein the first installation portion is opposite to the second installation portion and the first groove is corresponding to the second groove, wherein one side of the light source board is disposed in the first groove and another side of the light source board is disposed in the second groove.

* * * * *